UNITED STATES PATENT OFFICE.

THOMAS H. BLACKNALL AND WILLIAM T. JORDAN, OF ATLANTA, GEORGIA.

COMPOSITION FOR BLACKBOARDS.

SPECIFICATION forming part of Letters Patent No. 638,003, dated November 28, 1899.

Application filed March 21, 1899. Serial No. 709,994. (No specimens.)

*To all whom it may concern:*

Be it known that we, THOMAS H. BLACKNALL and WILLIAM T. JORDAN, citizens of the United States of America, and residents of Atlanta, in the county of Fulton and State of Georgia, have made a certain new and useful Improvement in Compositions for Blackboards; and we do hereby declare the following to be a full, clear, and exact description of the invention, such as will enable others skilled in the art to which it appertains to make and use the same.

The object of this invention is to provide a composition of such a character as will permit of its use for blackboards and the like. To this end we have devised a composition which when made up and finished possesses a hard, slightly-granular, or abrasive surface whereby it is adapted to receive upon said surface such marks as are desired, possessing an apparently smooth glossy surface and yet being capable of having such marks easily and cleanly erased by the use of the ordinary blackboard-rubber. Further, the entire body of the product is of the same nature and color and of such hardness that no matter how much is removed in finishing the surface said surface will always be well adapted to exhibit to the best advantage the marks placed thereon and be free from danger of scratching or abrasion by the small hard-shell particles so often found in crayons.

This compound consists of emery-flour, about three per cent.; pumice-stone, about two per cent.; lampblack, three per cent., and chrome-green, one per cent., which are all thoroughly mixed and impregnated with a liquid suitable to cause them to adhere and form, together with the ingredient hereinafter included, a hard solid mass of even and the same texture throughout. The nature of this liquid will be hereinafter set forth. This mixture is then thoroughly intermixed with about ninety-one per cent. of paper-stock such as required to make a hard fibrous board—such, for example, as hard-wood fiber. When the fiber is of a sufficiently adhesive nature, water may be used as the liquid ingredient; but if it is not of such adhesive nature about one per cent. of sodium silicate will be added to the compound.

In the mechanical manufacture of sheets of this material or compound rollers are employed, to which may be added, if desired, a calendering process, and the sheets should be also dried in a suitable manner, preferably by heated rolls. If the natural surface of the dried sheets is not such as desired, the surface may be dressed or finished by any cutting or abrading process—such, for example, as passing them through a sanding-machine—the process and manipulation being governed by well-known rules to produce a desired surface. The sheets thus formed to make a blackboard may be installed in the wall or framed for smaller portable blackboards.

Having thus described our invention, what we claim as new, and desire to secure by Letters Patent of the United States, is—

1. A blackboard compound consisting of emery-flour, pumice-stone, lampblack, chrome-green and hard-wood fiber, in about the proportions specified.

2. A blackboard compound consisting of emery-flour, pumice-stone, lampblack, chrome-green, paper-stock and an adhesive liquid, in about the proportions specified.

In testimony whereof we hereunto affix our signatures in presence of two witnesses.

THOMAS H. BLACKNALL.
WILLIAM T. JORDAN.

Witnesses:
A. P. WOOD,
S. M. WOOD.